Dec. 1, 1970  N. C. JACKSON  3,543,465
EXTERIOR MOLDING STRUCTURE
Filed June 6, 1968
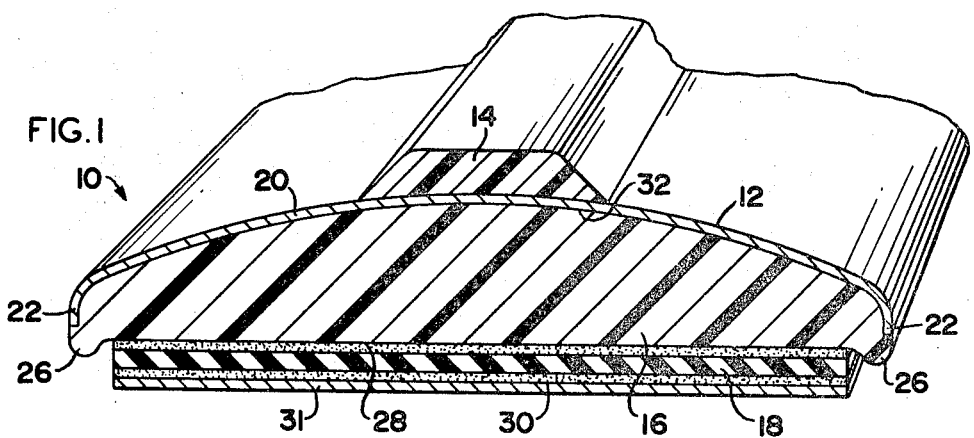
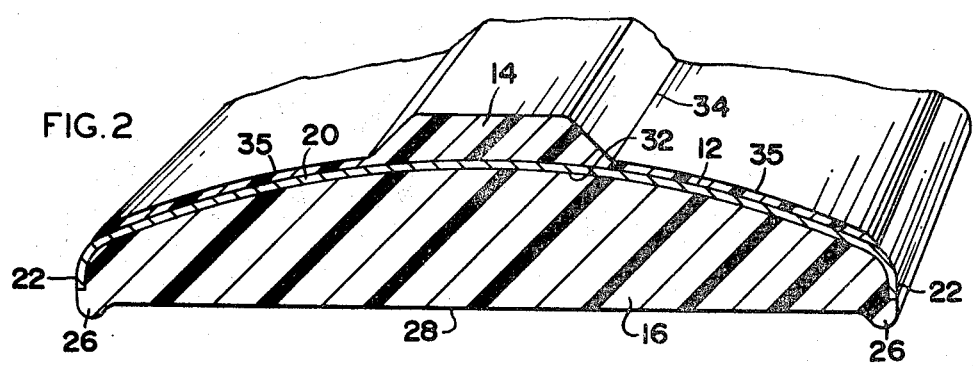
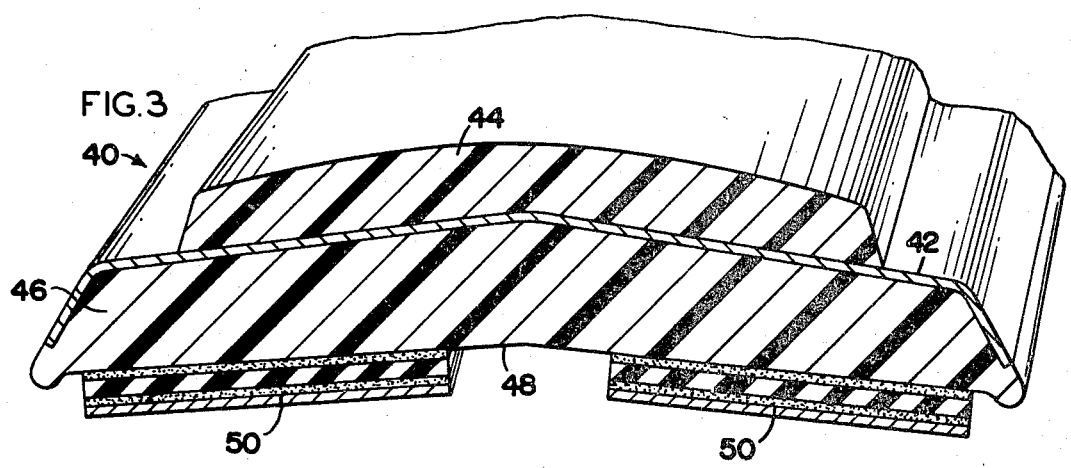
INVENTOR.
NORMAN C. JACKSON
BY
Meyer, Tilberry & Body
ATTORNEYS.

United States Patent Office 3,543,465
Patented Dec. 1, 1970

3,543,465
EXTERIOR MOLDING STRUCTURE
Norman Charles Jackson, Sheffield Lake, Lorain, Ohio, assignor to The Standard Products Company, Cleveland, Ohio, a corporation of Ohio
Filed June 6, 1968, Ser. No. 734,907
Int. Cl. B60r 13/02
U.S. Cl. 52—716    6 Claims

ABSTRACT OF THE DISCLOSURE

An exterior molding for automobiles having a channel shaped metallic member filled with vinyl material and a vinyl bumper secured to the outer surface of the channel. Adhesive tape is employed to secure the molding to the supporting surface. The surfaces of the channel are selectively primed and vinyl material is extruded directly on to the surfaces of the channel and removed from the un-primed surfaces.

---

This invention relates to trim strip or molding structures and, more particularly, to exterior molding structures for an automobile body.

Various types and configurations of molding strips have been devised and employed on automobiles for many years. Typically, these moldings have comprised a channel-shaped metallic member which is secured by clips, studs or other types of fastener devices to the exterior of the automobile body. Such moldings have given generally satisfactory service but have been subject to some objections. For example, it is a common experience that the moldings will receive a certain amount of abuse and, over a period of time, sustain dents in the surface thereof thereby detracting from the finished appearance of the automobile. Moreover, the trim strip, because of its relatively rigid nature, will cause the paint to be chipped on a car door if the door of an adjacent automobile is inadvertently swung against the trim strip.

For these reasons, as well as others including a desire for a decorative molding, there has been developed recently a trim strip which employs what is, in effect, a resilient bumper on the surface of the strip. One such example of this type of strip is a channel-shaped metallic member of relatively heavy gauge metal on which a plastic or non-metallic material is adhesively secured to a portion of the outer surface of the strip. The plastic material provides a relatively resilient member which protects the strip from dents and avoids causing damage to an object such as a car door which may contact the strip. Strips of this type have been secured to the automobile body in a substantially traditional fashion through the use of spring clips or other conventional fasteners.

This latter type of molding, although generally satisfactory from a functional standpoint, does raise serious problems. Thus, the relatively heavy gauge material and the other material employed in the manufacture of the molding make the molding a relatively expensive item to produce from a material standpoint. Moreover, the manufacturing costs of such a structure are substantial. In addition, the use of clips or studs or other types of fasteners in installing such a molding comprises a significant cost factor.

It is a primary object of this invention to provide an improved molding or trim strip which employs a bumper on the outer surface thereof.

It is another object of this invention to provide an improved etxerior molding which is less costly to produce, both from a manufacturing as well as a material standpoint.

It is a further object of this invention to provide a trim strip structure which is easier to install than structures previously used.

It is still a further object of this invention to provide a novel and inexpensive method of manufacturing a molding structure having a bumper on the outer surface thereof.

In accordance with one aspect of this invention, there is provided a trim strip or molding structure which comprises a generally channel-shaped, elongated thin metallic member defined by generally transverse portion and leg portions depending from either side thereof. A non-metallic material such as a vinyl composition substantially fills the inner space within said channel and is adhesively secured to the inner surface of the channel. A non-metallic material is adhesively secured on a portion of the outer surface of the metallic member and extends along the length thereof. A resilient adhesive tape is secured to the lower surface of the non-metallic material within the channel with the tape providing the means by which the channel may be secured to the automobile body.

The invention further contemplates a method of producing the molding structure in which the channel-shaped elongated metallic member is coated with a primer over the entire inner surface thereof while the outer surface is coated with the primer only along the area to which the bumper is to be applied. The non-metallic material is then applied to both surfaces of the channel-shaped member with the material being bonded to the channel only in the areas to which the primer has been applied. Thereafter, the material is removed from the unprimed areas of the channel leaving only a selected portion of the channel to which the bumper is secured with the remainder being an exposed metallic surface.

Other objects and features of the invention will be apparent upon a complete reading of the following description which discloses, together with the attached drawings, but a preferred embodiment of the invention. Such preferred embodiment is not intended to be limiting inasmuch as it constitutes but one of the various ways in which the principles of this invention may be employed.

Referring now to the drawings wherein like reference numerals indicate like parts in the various views:

FIG. 1 is a sectional view through a strip or molding produced in accordance with this invention.

FIG. 2 is a perspective view illustrating an intermediate step in the production of the molding of FIG. 1.

FIG. 3 is a sectional view similar to FIG. 1 showing a modified embodiment of the invention.

Referring now to FIG. 1, there is illustrated an exterior molding or trim strip structure indicated generally by the reference numeral 10. This trim strip comprises a channel-shaped metallic member 12, a bumper portion 14 on the upper or outer surface thereof, a body portion 16 secured to the lower or inner surface of the metallic member 12 and securing means in the form of a tape 18 secured to the lower surface of the body portion 16. It is this broad combination of elements which comprises the improved molding structure. It will be appreciated that the molding structure described more in detail hereinafter would be employed by applying the structure to the side of an automotive body with the adhesive means 18 comprising the means by which the molding would be secured thereto.

Referring now more in detail to the molding structure 10, the metallic member 12 is generally channel-shaped or U-shaped in configuration and includes a transverse portion 20 with leg portions 22 depending from either end thereof. The transverse portion 20 is generally bowed in an upper direction to provide a generally convex upper surface on the molding structure.

The bumper portion 14 comprises a suitable material such as a vinyl composition which is adhesively bonded to the central portion of the metallic member 12 and extends longitudinally therealong. The securement of the bumper portion 14 to the metallic member ordinarily would be accomplished by the use of an appropriate primer which would insure the bonding of the vinyl to the metallic member which, in the preferred embodiment, would be a material such as stainless steel.

Disposed in the interior of the channel is the body portion 16 which is also preferably a vinyl composition. As shown in FIG. 1, the vinyl body portion 16 entirely fills the interior of the channel 12 with the vinyl being in bonded engagement with the inner surface of the channel throughout its transverse and longitudinal width and length. The inner surface of the channel is also primed with a suitable primer to insure the bonding of the vinyl body portion 16 to the interior surface of the channel 12.

It will be appreciated that the vinyl body 16 need not necessarily completely fill the interior of the channel; however, it is important that a substantial thickness of the vinyl body be in engagement with the inner surface of the channel at substantially all points thereby to provide support for the relatively thin gauge material from which the channel is constructed.

The vinyl material in the body portion 16 preferably extends below the legs 22 of the channel 12 to form ridges or ribs 26 extending along either longitudinal edge thereof. The ridges 26 extend outwardly to enclose the ends of the legs 22 and serve to prevent contact between the metal comprising the channel and the automotive body to which the molding is to be secured. Moreover, the ribs extended below the bottom surface 28 of the body portion 16 and define a finished edge on the inner surface of the molding.

The adhesive means 18 by which the molding is attached to the automotive body is positioned between the two longitudinal ridges 26. The adhesive means may comprise any suitable material which is generally resilient and which has a sufficient adherent capacity to retain the molding in position on the body of the automobile. Some examples of such adhesive means are poly-urethane tapes and expanded neoprene tapes, both of which preferably are pressure sensitive on both sides so that the tape is adhesively secured to the lower surface 28 of the body portion 16 and also has an adhesive surface 30 which may be placed against the automobile body to secure the molding in position. A releasable paper backing 31 protects the adhesive surface 30 until the molding is to be attached, at which time the backing paper is removed and discarded.

It is to be appreciated that relatively inexpensive materials are employed in the production of the described molding structure. Thus, the metallic member 12 may be relatively thin gauge material and thereby reduce the material cost for the structure. As an example, the metallic material may be in the foil classification and have a thickness of .005 inch. The use of such a relatively thin metallic material is permissible because of the support provided for the metal by the body portion 16. Heavier gauge material, for example, on the order of .020 inch, may be employed if desired. Distinguished from this is the prior art in which the metal must be self-supporting and, for this reason, has required a relatively heavy gauge. Moreover, the pressure sensitive tape provides a comparatively inexpensive and quick means whereby the molding may be attached to the automobile thereby reducing not only the cost of the assembly but also the installation cost.

Referring now to the method of manufacturing the molding of FIG. 1, it is contemplated that the metallic member 12 will first be formed to the desired shape. Thereafter, the metallic member will be coated with a priming material on the inner surface 32 of the channel. The primer is a suitable substance, the particular specifications of which depend upon the particular materials to be employed in the construction of the molding. Similarly, the outer or upper surface of the metallic member 12 will be selectively coated with the primer. Specifically, the area of the channel to which the bumper 14 is to be secured will be coated with the primer while the remaining area of the outer surface of the metallic member will be left in its unprimed condition. Thereafter, the vinyl material will be extruded and applied to the metallic member both on the upper and lower surfaces. As shown in FIG. 2, the extruded vinyl material on the upper surface includes, in addition to the bumper 14, a thin vinyl film 35 which extends along the entire upper surface of the metallic member. Similarly, the entire inner space within the channel is filled with the vinyl material comprising the body portion 16. Thereafter, the vinyl material on the upper surface is scored along a score line 34 on either side of the bumper portion 14 and the thin film 35 of vinyl material on either side of the bumper is peeled away from the metallic surfaces thereby exposing the metal and leaving only the bumper portion 14 secured to the channel. In this manner, the attractive stainless steel appearance of the metallic member is retained while achieving the advantages and decorative effect of having the resilient bumper 14 secured over a portion of the molding.

Referring now to FIG. 3, there is a modified form of the molding which is similar to that shown in FIG. 1 and the method of fabricating the molding would be as described above. As illustrated, the molding 40 of FIG. 3 includes a channel-shaped metallic member 42 with a bumper portion 44 and a vinyl body portion 46. The lower surface 48 of the vinyl body is not planar, but rather, comprises two angularly disposed surfaces to which two separate pieces of pressure sensitive tape 50 are applied. The molding is in all other material respects substantially the same as that shown in FIG. 1, but the molding 40 is because of the angular position of the lower surface 48 and the tapes 50, adapted to be secured to a non-planar surface.

As an alternative to the pressure sensitive tape employed in both the embodiments of FIGS. 1 and 3, it is also contemplated that a heat reactive adhesive might be substituted on the lower surface of the molding. This adhesive could be reactivated as the automobile passes through the flow oven thereby to form a secure bond with the automobile panel.

A further alternative to pressure sensitive adhesive means for securing the molding to the panel might be the use of some form of recess molded into the body portion 16. The recess may be of such a configuration that it cooperates with a stud or other type of fastener of the panel to retain the molding in position.

Irrespective of the securing means employed, it is desirable that the end of the molding be specially treated to provide an attractive and finished appearance. This is best accomplished in the following manner. The desired length of the molding is measured from a continuous strip and is thereafter severed from the strip. The severing operation may employ either a straight cut across the strip or a contour cut. A contour cut would leave the raw end of the molding with a generally curved or rounded configuration. Thereafter, the metallic portion of the strip is bent over until the free end of the metallic member lies in the same plane as the lower most edge of the legs 22. In this manner, the end of the molding is given a smoothly rounded configuration with the metallic member completely covering the raw edge of the severed vinyl body.

The bending over of the metallic member necessary deforms some of the material in the body. This results in a non-planar condition on the lower surface of the body adjacent to the end. To correct this, it is necessary that a portion of the body material be removed beneath the formed end thereby to provide a continuous planar surface along the entire length of the lower surface of the strip. Some of the body material may be removed before the metallic member is bent over but it is preferred that the excess material be removed after the bending operation thereby assuring that a planar lower surface is achieved.

Changes and modifications in the invention will suggest themselves to those having ordinary skill in the art. Such changes and modifications are intended to be included within the spirit and scope of the invention as defined by the appended claims.

Having thus described my invention, I claim:

1. A molding structure adapted to be secured to the panel of an automobile comprising:
a generally channel-shaped, elongated, metallic member defined by a generally transverse portion with leg portions depending from either side thereof and having inner and outer surfaces,
a non-metallic material in the inner space of said channel between said legs with a substantial thickness of the non-metallic material being secured to the inner surface of said metallic member over a substantial portion of the width and length thereof, and non-metallic decorative material adhesively secured on only a portion of the outer surface of said member whereby a portion of said outer surface is exposed.

2. The structure of claim 1 and further including means secured to the lower surface of said non-metallic material in said channel for securing said molding structure to a supporting surface.

3. The structure of claim 2 wherein said securing means comprises pressure sensitive tape.

4. The structure of claim 1 wherein said material in said channel includes means for securing said molding structure to a supporting structure.

5. The structure of claim 1 wherein the terminal ends of said leg portions are embedded in said material in said channel whereby said ends are prevented from engaging any supporting surface to which the structure may be attached.

6. The structure of claim 1 wherein said metallic member has a thickness on the order of .005 to .020 inch.

References Cited
UNITED STATES PATENTS

| | | | |
|---|---|---|---|
| 2,928,201 | 3/1960 | Shanok et al. | 52—716 XR |
| 3,310,928 | 3/1967 | Weimar | 52—716 |
| 3,436,297 | 4/1969 | Brooks et al. | 161—123 X |
| 3,451,709 | 6/1969 | Swanger | 293—1 |

PRICE C. FAW, JR., Primary Examiner

U.S. Cl. X.R.
161—121, 123; 293—1